(12) United States Patent
Chow et al.

(10) Patent No.: US 10,983,088 B2
(45) Date of Patent: Apr. 20, 2021

(54) COULOMETRIC MICROFLUIDIC SENSORS USING A SILVER BAND ELECTRODE, AND METHODS THEREOF

(71) Applicant: University of Massachusetts, Boston, MA (US)

(72) Inventors: Kwok-Fan Chow, Burlington, MA (US); Jung Min Oh, Woodbury, MN (US); Mahadurage Sachintha Wijesinghe, Lowell, MA (US)

(73) Assignee: University of Massachusetts, Boston, MA (US)

( * ) Notice: Subject to any disclaimer, the term of this patent is extended or adjusted under 35 U.S.C. 154(b) by 617 days.

(21) Appl. No.: 15/471,238

(22) Filed: Mar. 28, 2017

(65) Prior Publication Data

US 2017/0276643 A1 Sep. 28, 2017

Related U.S. Application Data

(60) Provisional application No. 62/314,148, filed on Mar. 28, 2016.

(51) Int. Cl.
*G01N 27/42* (2006.01)
*G01B 11/02* (2006.01)
*B01L 3/00* (2006.01)
*G01N 27/327* (2006.01)
*H01M 10/0525* (2010.01)

(52) U.S. Cl.
CPC ...... *G01N 27/423* (2013.01); *B01L 3/502707* (2013.01); *G01B 11/02* (2013.01); *H01M 10/0525* (2013.01); *B01L 2300/0645* (2013.01); *B01L 2300/0663* (2013.01); *B01L 2300/0816* (2013.01); *B01L 2300/0877* (2013.01); *B01L 2300/168* (2013.01); *G01N 27/3277* (2013.01); *H01M 2220/30* (2013.01)

(58) Field of Classification Search
CPC .............. G01N 27/423; G01N 27/3277; B01L 3/502707; B01L 2300/0663; B01L 2300/168; B01L 2300/0816; B01L 2300/0877; B01L 2300/0645; H01M 10/0525; H01M 2220/30; G01B 11/02
See application file for complete search history.

(56) References Cited

U.S. PATENT DOCUMENTS

2009/0178935 A1* 7/2009 Reymond .......... G01N 27/3273
205/777.5
2011/0155586 A1* 6/2011 Elibol ................ G01N 27/3278
205/777.5

(Continued)

OTHER PUBLICATIONS

Chow et al. (K-F Chow, B-Y Chang, BA Zaccheo, F Mavre, RM Crooks, A sensing platform based on electrodissolution of a AG bipolar electrode, J. Am. Chem. Soc. 132 (2010) 9228-9229) (Year: 2010).*

(Continued)

*Primary Examiner* — Luan V Van
*Assistant Examiner* — Joshua L Allen
(74) *Attorney, Agent, or Firm* — Milstein Zhang & Wu LLC

(57) ABSTRACT

The invention provides novel microfluidic coulometric sensors having a silver (Ag) band electrode longitudinally placed in a microchannel affording visual readout suitable for the naked eye, and methods of fabrication and applications thereof.

11 Claims, 14 Drawing Sheets

(56) References Cited

U.S. PATENT DOCUMENTS

| | | | |
|---|---|---|---|
| 2012/0247980 A1* | 10/2012 | Burke | G01N 27/4035 205/792 |
| 2012/0298511 A1* | 11/2012 | Yamamoto | G01N 15/1056 204/602 |
| 2014/0124383 A1* | 5/2014 | Miyahara | G01N 27/4145 205/780.5 |
| 2016/0202206 A1* | 7/2016 | Goluch | G01N 27/3275 205/777.5 |
| 2017/0184543 A1* | 6/2017 | Posner | G01N 27/44747 |

OTHER PUBLICATIONS

Fosdick et al. (SE Fosdick, RM Crooks, Bipolar electrodes for rapid screening of electrocatalysts, J. Am. Chem. Soc. 134 (2012) 863-866) (Year: 2012).*

Mavre et al. (F Mavre, RK Anand, DR Laws, K-F Chow, B-Y Chang, JA Crooks, RM Crooks, Bipolar electrodes: a useful tool for concentration, separation and detection of analytes in microelectrochemical systems, analytical chemistry 82(21) (2010) 8766-8774) (Year: 2010).*

Zhan et al. (W Zhan, J Alvarez, RM Crooks, Electrochemical sensing in microfluidic systems using electrogenerated chemiluminescence as a photonic reporter of redox reactions, J. Am. Chem. Soc. 124 (2002) 13265-13270) (Year: 2002).*

\* cited by examiner

COULOMETRIC MICROFLUIDIC SENSORS USING A SILVER BAND ELECTRODE, AND METHODS THEREOF

PRIORITY CLAIMS AND RELATED PATENT APPLICATIONS

This application claims the benefit of priority from U.S. Provisional Application Ser. No. 62/314,148, filed on Mar. 28, 2016, the entire content of which is incorporated herein by reference in its entirety.

TECHNICAL FIELDS OF THE INVENTION

The invention generally relates to coulometric sensing devices. More particularly, the invention relates to microfluidic coulometric sensors based on an unconventional construct involving a silver (Ag) band electrode longitudinally placed in a microchannel providing visual readout suitable for the naked eye, and methods of fabrication and applications thereof.

BACKGROUND OF THE INVENTION

Analytical sensors are valuable tools in clinical analysis settings. Microfluidic sensors have gained much attention recently in point-of-care diagnostics because the microfluidic component allows for assays of chemical and biological specimens with fast turnaround times and small sample or reagent volumes. Electrochemical sensors have been integrated with various modalities of sampling, fluidic handling, separation and other detection principles. Besides clinical diagnostics, microfluidic sensing has also gained popularity in electrochemical sensing in the areas of environmental monitoring, and food analysis. (Sia, et al. 2008 *Lab Chip* 8, 1982-1983; Chin, et al. 2012 *Lab Chip*, 12, 2118-2134; Sameenoi, et al. 2012 *J. Am. Chem. Soc.* 134, 10562-10568; Hanrahan, et al. 2004 *J. Environ. Monit.* 6, 657-664; Escarpa, et al. In *Agricultural and Food Electroanalysis*; John Wiley & Sons, Ltd, 2015, pp 331-356; Crevillén, et al. 2007 *Talanta* 74, 342-357; Crevillén, et al. 2007 *Anal. Chem.* 79, 7408-7415; Nemiroski, et al. 2014 *PNAS* 111, 11984-11989; Wang, et al. 2008 *Sensors* 8, 2043.)

In clinical diagnostics, many microfluidic electrochemical sensors have been developed for nucleic acids, proteins, and antibodies using different modes of interactions between recognition elements and analytes, e.g., probe and target nucleic acid binding, antibody and antigen binding, and an enzyme and analyte reaction that consumes or produces an electrochemical species. (Rackus, et al. 2015 *Chem. Soc. Rev.* 44, 5320-5340; Ronkainen, et al. 2010 *Chem. Soc. Rev.* 39, 1747-1763.)

Many commercial electrochemical sensors, including biosensors and chemical sensors, are based on amperometric or coulometric measurements because the Faradaic current and charge are in direct correlation with a target analyte concentration. The sensor applies voltage to the target analyte and converts the concentration of the target molecule into Faradaic current, which is then processed via electronic data processing to give a numeric value with an appropriate unit on the front display panel. (Clarke, et al. 2012 *Br. J. Biomed. Sci.* 69, 83-93; Wang, J. 2008 *Chem. Rev.* 108, 814-825; Bard, et al. 2001 *Electrochemical Methods: Fundamentals and Applications*, 2nd ed.; John & Wiley & Sons, Inc.: Hoboken, N.J.; Wang, J. 2006 *Analytical Electrochemistry*, 3rd ed.; John Wiley & Sons, Inc.: Hoboken, N.J.; Grieshaber, et al. 2008 *Sensors* 8, 1400.)

While sensing the target materials and acquiring relevant data from the observed Faradaic currents are typically straightforward, structurally simplifying the sensors and their designs and data processing to meet the need of specific applications and settings have remained challenging.

Thus, there is an ongoing need for novel analytical protocols and constructs, in particular, that allows simple, disposable, yet robust electrochemical sensing without the need for complex electronic systems or data processing capabilities.

SUMMARY OF THE INVENTION

The invention provides a novel approach to electrochemical sensing. The microfluidic construct disclosed herein involves sensing (e.g., detecting, analyzing and/or measuring) chemical or biological analytes on a working electrode and providing a visual readout of the analyte (e.g., presence, concentration) on a counter electrode of metallic silver (Ag) band in a microchannel. This unconventional coulometric sensing platform allows analyte sensing that completely avoids data acquisition and system processing and provides a visual readout suitable for the direct observation by the naked eye. The microfluidic sensing system of the invention not only is built on a robust electrochemical platform, but also is well suited for applications requiring simple and disposable tools.

As disclosed herein, the coulometric sensing platform of the invention features a display mechanism that relies on the electro-oxidation of metallic Ag as a complementary reaction to the sensing electro-reduction reaction. To achieve quantitative and reliable readout, the Ag band counter electrode is arranged longitudinally in a microchannel while the frontal tip of the band electrode directly faces a working electrode (e.g., a gold (Au) electrode), which lies across the microchannel. Due to the Ohmic potential drop across the solution in the microchannel, the Ag oxidation always occurs at the Ag band electrode's tip region that faces the working electrode. The decrement of the Ag electrode correlates linearly with an analyte concentration and with an analyte feeding rate and is easily detectable and measurable by the naked eye.

In one aspect, the invention generally relates to a microfluidic sensing device. The device includes: a microchannel having an inlet for ingress and an outlet for egress of a liquid sample; a Ag band electrode, comprising of a metallic Ag band, longitudinally disposed in the microchannel; and a working electrode disposed across the microchannel and perpendicular to the Ag band electrode. In certain preferred embodiments, the sensing device further includes a reference electrode.

In another aspect, the invention generally relates to an article of manufacture comprising a microfluidic sensing device disclosed herein.

In yet another aspect, the invention generally relates to a method for detecting or analyzing an analyte. The method includes: performing an electrochemical reaction involving electro-reduction of the analyte and electro-oxidation of a Ag band electrode comprising a metallic Ag band; and detecting or analyzing the analyte by measuring the length of the Ag band.

DETAILED DESCRIPTION OF THE INVENTION

The invention provides an unconventional electrochemical sensing platform that can transform a coulometric electrochemical measurement into a visual signal for the naked eye. The invention provides a novel approach to electrochemical sensing with the concept of point-to-plane-like electrode configuration.

The sensing system of the invention is based on the principle of coulometry in a three-electrode setup to allow the indirect quantitative detection of an electrochemical reaction based on Ag oxidation on a band counter electrode. The microfluidic construct involves sensing analytes on a working electrode and providing a visual readout of the analyte concentration on a Ag band counter electrode. The apparent length of the Ag band electrode is used to report the sensing event that has occurred at the working electrode surface.

Significantly, the analytical platform of the present invention can translate an electrochemical reaction directly to a visible readout without the need for a data processing system and enables easy-to-use, disposable, and point-of-care diagnostic sensors.

Crooks and co-workers studied coulometric analysis in the field of bipolar electrodes (BPEs) using a thin layer of metallic Ag. A protocol was developed that involves the electro-dissolution of Ag on the anodic pole of a BPE, coupled with the reduction of an electroactive species on the cathodic pole. The electro-dissolution of the Ag provides a permanent record of a sensing and/or recognition event that can be observed by the naked eye or magnifying glass. (Chow, et al. 2010 *J. Am. Chem. Soc.* 132, 9228-9229; Fosdick, et al. 2012 *J. Am. Chem. Soc.* 134, 863-866; Zhan, et al. 2002 *J. Am. Chem. Soc.* 124, 13265-13270; Mavré, et al. 2009 *Anal. Chem.* 81, 6218-6225; Mavre, et al. 2010 *Anal. Chem.* 82, 8766-8774; Fosdick, et al. 2013 *Angew. Chem. Int. Ed.* 52, 10438-10456; Loget, et al. 2011 *Anal. Bioanal. Chem.* 400, 1691-1704.)

The fundamental principle that underlies the present invention is different from that employed by Crooks and co-workers. In particular, bipolar electrochemistry is based on the potential drop between the two driving electrodes.

The length of the BPE determines the difference in potential between the anodic and cathodic poles of the BPE.

Figure 1:
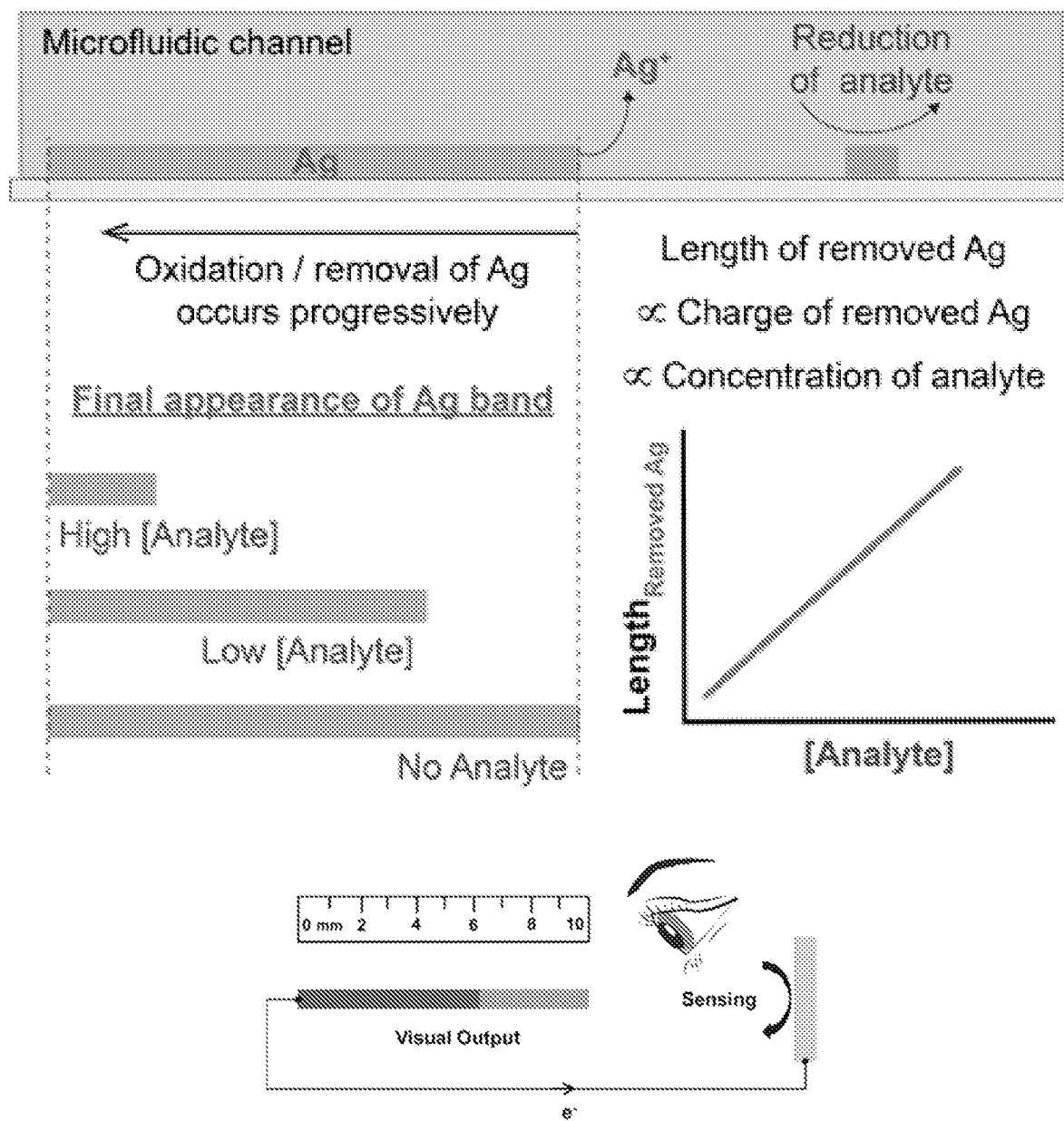
FIG. 1. Schematic illustration of an exemplary embodiment of the coulometric sensing platform according to the invention.

The concept is illustrated in FIG. 1. In the disclosed coulometric sensing platform, the potential of the working electrode is controlled using a reference electrode in a three-electrode cell setting. Although the length of the counter electrode changes while the sensing reaction is occurring at the working electrode, the potential at the working electrode is maintained. Therefore, the sensing measurement is not affected by the change in the length of the counter electrode. Moreover, the working electrode can be separated chemically and physically from the counter electrode that is positioned in the microfluidic system.

In the unconventional design, the band counter electrode is oriented longitudinally within a microchannel while the working electrode is positioned perpendicular to the counter electrode in a point-to-plane-like configuration. The importance of this configuration is that Faradaic reactions on the counter electrode can be confined to the tip of the electrode due to the Ohmic potential drop across the solution within the microchannel. To illustrate the sensing capability of this design, the counter electrode is coated with a thin layer of metallic Ag that gives a visual signal by electro-oxidation while an electrochemical reduction sensing reaction is carried out at the working electrode.

Because the Faradaic reaction on the counter electrode occurs only at its band tip, the Ag oxidation occurs gradually toward the inner portion of the electrode, which results in shortening the length of the Ag band electrode. The amount of reduced species in the analyte solution therefore can be estimated by the apparent length of the Ag band using only the naked eye, without the need for a signal converter, data processor, or digital displayer. In the disclosed approach, the electrodes are integrated into a microfluidic channel for convenience to facilitate the sample solution flow to the working electrode and to achieve precise and consistent measurements. The counter electrode length is optimized at centimeter scale in order to be seen with the naked eye.

In one aspect, the invention generally relates to a microfluidic sensing device. The device includes: a microchannel having an inlet for ingress and an outlet for egress of a liquid sample; a Ag band electrode, comprising of a metallic Ag band, longitudinally disposed in the microchannel; and a working electrode disposed across the microchannel and perpendicular to the Ag band electrode.

In certain embodiments, the sensing device further includes a reference electrode.

In certain embodiments, the microfluidic sensing device further includes an electric power source connected to the Ag and working electrodes.

The working electrode may be made of any suitable materials (e.g., metallic or non-metallic). In certain embodiments, the working electrode is made of Au, platinum or carbon.

The reference electrode may be made of any suitable materials (e.g., metallic or non-metallic). In certain embodiments, the reference electrode is made of or coated with Ag, platinum, aluminum, carbon, or silver/silver chloride (Ag/AgCl).

The Ag band has a constant area along the length of the Ag band.

The Ag band may have any suitable shape as its cross-section. In certain embodiments, the Ag band has a rectangular shaped cross-section. In certain embodiments, the Ag band is wire-shaped and has a round or oval shaped cross-section.

In certain embodiments, the potential of the working electrode is controlled versus the counter electrode and/or the reference electrode.

In certain embodiments, the method does not include a step of data acquisition or processing.

The microchannel may have any suitable dimensions. In certain embodiments, the microchannel has a dimension of a width or diameter of about 1 μm to about 10 mm (e.g., about 1 μm to about 1,000 μm, about 1 μm to about 500 μm, about 1 μm to about 100 μm, about 10 μm to about 10 mm, about 100 μm to about 10 mm, about 1,000 μm to about 10 mm, about 10 μm to about 1,000 μm, about 50 μm to about 500 μm).

In certain embodiments, the microchannel has a length of about 1 mm to about 50 mm (e.g., about 2 mm to about 50 mm, about 5 mm to about 50 mm, about 10 mm to about 50 mm, about 1 mm to about 30 mm, about 1 mm to about 20 mm, about 1 mm to about 100 mm, about 1 mm to about 30 mm, about 2 mm to about 20 mm).

The microchannel may be made of any suitable materials. In certain embodiments, the microchannel is made of a polymeric material. In certain embodiments, the microchannel is made of a glass material. In certain embodiments, the polymeric material is selected from polydimethylsiloxane and poly(methyl methacrylate).

The microfluidic sensing device may be powered by any suitable electrical power source (e.g., alkaline or lithium-ion battery units).

In another aspect, the invention generally relates to an article of manufacture comprising a microfluidic sensing device disclosed herein.

In certain embodiments, the article of manufacture is an environmental sensor useful for analyzing or monitoring an analyte (e.g., chemical oxidants and oxidizers) in an environment.

In certain embodiments, the article of manufacture is a food sensor useful for analyzing or monitoring an analyte (e.g., pathogens) in a food product.

In certain embodiments, the article of manufacture is a diagnostic device or kit useful for analyzing or monitoring an analyte (e.g., biomarkers and pathogens) in a sample of a patient.

In certain embodiments, the article of manufacture is a single use and disposable unit or kit.

In yet another aspect, the invention generally relates to a method for detecting or analyzing an analyte. The method includes: performing an electrochemical reaction involving electro-reduction of the analyte and electro-oxidation of a Ag band electrode comprising a metallic Ag band; and detecting or analyzing the analyte by measuring the Ag band.

In certain embodiments, the method further includes: prior to performing an electrochemical reaction, providing a microfluidic sensing device disclosed herein; and introducing a sample to be detected or analyzed for the analyte into the microchannel.

In certain embodiments of the method, detecting or analyzing the analyte is by visual readout of a dimension of the Ag band.

The analyte may be in any suitable liquid form. In certain embodiments, the analyte is in an aqueous sample.

The analyte may be any suitable molecule, material or substance. In certain embodiments, the analyte is a biomolecule.

In certain embodiments, the analyte is a protein or polypeptide (e.g., an enzyme) or antibodies. As used herein, the terms "polypeptide" and "protein" are used interchangeably to refer to a polymer of amino acid residues, and are not limited to a minimum length. Thus, peptides, oligopeptides, dimers, multimers, and the like, are included within the definition. Both full-length proteins and fragments thereof are encompassed by the definition. The terms also include post-expression modifications of the polypeptide, for example, glycosylation, acetylation, phosphorylation, and the like. Furthermore, a "polypeptide" may refer to a protein which includes modifications, such as deletions, additions, and substitutions (generally conservative in nature), to the native sequence, as long as the protein maintains the desired activity. These modifications may be deliberate or may be accidental.

In certain embodiments, the analyte is a nucleic acid molecule (e.g., a DNA, RNA). As used herein, the term "nucleic acid molecule," "nucleotide," "oligonucleotide," "polynucleotide," and "nucleic acid" are used interchangeably herein to refer to polymeric forms of nucleotides of any length. They can include both double- and single-stranded sequences and include, but are not limited to, cDNA from viral, prokaryotic, and eukaryotic sources; mRNA; genomic DNA sequences from viral (e.g., DNA viruses and retroviruses) or prokaryotic sources; RNAi; cRNA; antisense molecules; ribozymes; and synthetic DNA sequences. The term also captures sequences that include any of the known base analogs of DNA and RNA.

In certain embodiments, the analyte is a microorganism.

In certain embodiments, the analyte is a virus.

The method of the invention can be employed to detect or analyze a sample with various ranges on analyte concentration. In certain embodiments, the method is capable of detecting an analyte at a concentration of about 1 ng/mL. In certain embodiments, the method is capable of detecting an analyte at a concentration of about 100 pg/mL. In certain embodiments, the method is capable of detecting an analyte at a concentration of about 10 pg/mL. In certain embodiments, the method is capable of detecting an analyte at a concentration of about 1 pg/mL.

In certain embodiments, the analyte is present in the sample at a concentration from about 1 pg/mL to about 1 mg/mL. In certain embodiments, the analyte is present in the sample at a concentration from about 1 pg/mL to about 1 ng/mL. In certain embodiments, the analyte is present in the sample at a concentration from about 1 ng/mL to about 1 µg/mL. In certain embodiments, the analyte is present in the sample at a concentration from about 1 µg/mL to about 1 mg/mL.

The microfluidic sensing device may be designed to complete the sensing electrochemical reaction is any suitable length of time, e.g., with 5 seconds, 30 seconds, within 1, 2, 5, 10, 20, 30 minutes.

Examples herein provide direct and explicit comparisons of the Faradaic charges that are obtained from the electrochemical processes that occur on the working and Ag band counter electrodes in order to validate the analytical aspects of the disclosed sensing platform. In addition, a series of electrochemical measurements using a model target analyte are presented to verify that the platform design is robust for electrochemical sensing and biosensor applications, specifically for many point-of-care applications that can be coupled with naked-eye detection.

Experiments presented below also demonstrated that two AA batteries can be used to operate the sensing devices disclosed herein.

Examples

The disclosed electrochemical sensing platform is based on the electro-oxidation of Ag that is predefined as a complementary Faradaic reaction to a sensing reduction reaction that occurs at a working electrode. The accumulated coulombic charge of the Ag electro-oxidation is correlated with the model analyte concentrations, and the length of the removed Ag is in direct correlation with the coulombic charge observed from the sensing reduction reaction.

The key feature that allows the sensing platform to be viable is the electrode configuration in a microchannel. The incorporation of the Ag band counter electrode longitudinally into the microchannel and the implementation of the Ohmic potential drop existing in the microchannel allow the Ag oxidation to progress from the tip region of the band electrode to the inner portion. In this case, the Ag band electrode serves as a visual gauge to report a quantitative measurement output. Another important feature of the disclosed device is that the Ag band electrode can be separated spatially from the sensing reaction. Therefore, the reporting or display function of the Ag band electrode is not affected by the color, turbidity, or concentration of the biological or chemical analyte fluids. A separate sensing compartment can be plugged into the reporting electrode system using a modular approach.

The Ag layer not only predefines the Faradaic reaction on the band electrode but also determines the limit of detection and sensitivity of the sensing system. The dimension and morphology of the band electrode can be optimized for various sensing applications. The cell design and operational principle of the sensing platform can be used for a wide range of low-cost, disposable, and point-to-care applications coupled with naked-eye detection.

Longitudinally-Oriented Ag Band Electrode in a Microchannel

Figure 2:
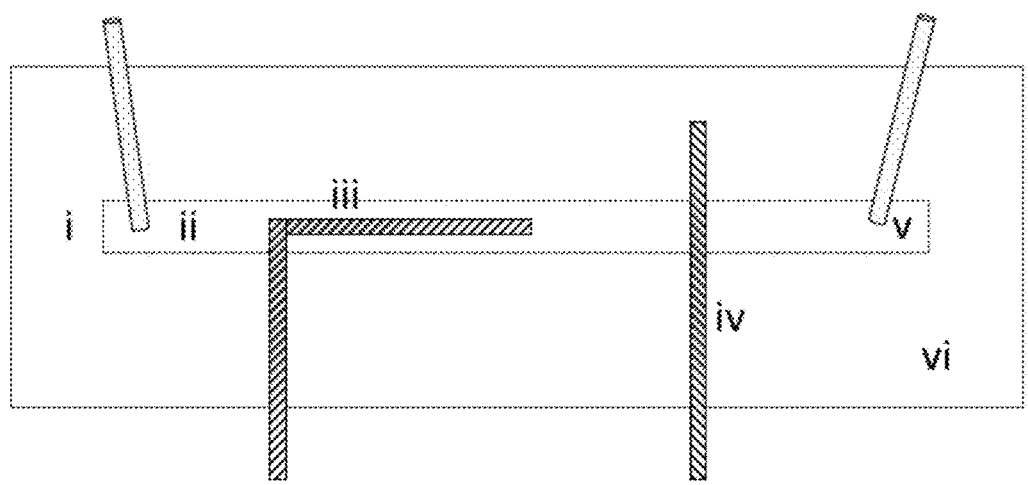
FIG. 2. Photograph of top view of the electrochemical device used for the experiments disclosed herein: (i) stainless steel tubing serving as an inlet, (ii) microchannel, (iii) Ag band electrode, (iv) Au electrode, (v) Ag tubing serving as the reference electrode and also as an outlet, and (vi) PDMS block.

FIG. 2 presents a photograph of an exemplary device according to the invention.

A unique feature of this design is that a Ag band counter electrode is housed within a narrow microchannel and is oriented perpendicular to a working electrode that lies across the microchannel. When a current is passed between the working and longitudinally oriented band electrodes, a significant iR drop occurs along the band electrode due to the resistance present in the microfluidic channel. (Cioffi, et al. 2011 *J. Electroanal. Chem.* 659, 92-100.)

The interfacial potential between the band electrode and the electrolyte solution is not constant throughout the surface of the band electrode. The iR drop in the electrolyte solution in the microchannel varies with the axial position of the electrodes that have opposite polarities. That is, the tip region of the band electrode that directly faces the working electrode experiences less of an iR drop effect compared to the inner portion of the band electrode. (Kissinger, P. T. In *Laboratory Techniques in Electroanalytical Chemistry*, Kissinger, et al. Eds.; Marcel Dekker, Inc.: New York, 1984, pp 611-635.)

Consequently, the tip portion of the band electrode experiences much faster oxidation than the rest of the band electrode. The use of this electrode geometry and the microfluidic system ensures that the oxidation of the Ag inevitably occurs at the tip region.

To illustrate the concepts that underlie the uneven distribution of the Ohmic potential along the band electrode (iR drop), an ECL experiment was carried out to visualize a site where an electrochemical reaction takes place over a band electrode surface. ECL converts Faradaic current into visible light. When a mixture of $Ru(bpy)_3^{2+}$ and TPrA are oxidized together, red luminescence is emitted on the electrode surface. The resulting emission intensity correlates with the current that passes through the electrode. (Bard, A. J.

Electrogenerated Chemiluminescence; Marcel Dekker, Inc.: New York, 2004; Richter 2004 *Chem. Rev.* 104, 3003-3036; Miao 2008 *Chem. Rev.* 108, 2506-2553; Forster, et al. 2009 *Annu. Rev. Anal. Chem.* 2, 359-385.)

Figure 3:
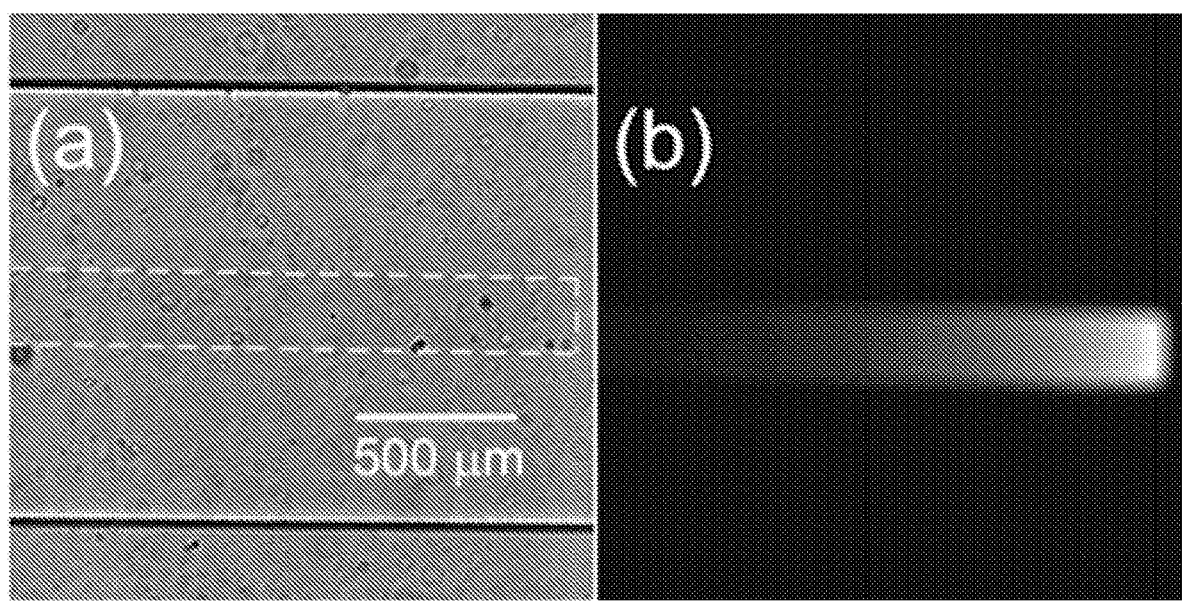
FIG. 3. (a) Optical image of ITO band electrode housed inside microchannel; only the tip portion of the electrode is shown. The yellow dotted line indicates the location of the ITO band electrode. (b) Luminescence micrograph showing the emission of ECL from the tip of the band electrode.

In this experiment, an ITO band electrode (250 µm wide×1.0 cm long) was used as the working electrode and housed in a PDMS microchannel (20 µm high×1250 µm wide×2.0 cm long). The Ag/AgCl reference and Pt wire counter electrodes were placed in a reservoir located approximately 1.0 cm from the tip of the band electrode. FIG. 3(a) shows an optical image of the tip portion of the band electrode. When a potential of 1.4 V (vs. Ag/AgCl, 1 M KCl) was applied to the band electrode, ECL emission was observed only at the tip portion of the band electrode, as shown in FIG. 3(b).

The results of this experiment clearly illustrate that an uneven potential distribution is present throughout the band electrode. Because of the iR drop in the electrolyte solution in the microchannel, the tip portion of the band electrode maintains a relatively higher current density level compared to the rest of the electrode. In other words, the potential difference at the interface between the electrode and the electrolyte solution drops across the microchannel. This potential gradient causes an uneven current density distribution throughout the band electrode. Therefore, the Faradaic reaction occurs at a higher rate around the tip of the band electrode relative to the inner portion.

Sample Device Applicability Characterization

Figure 4:
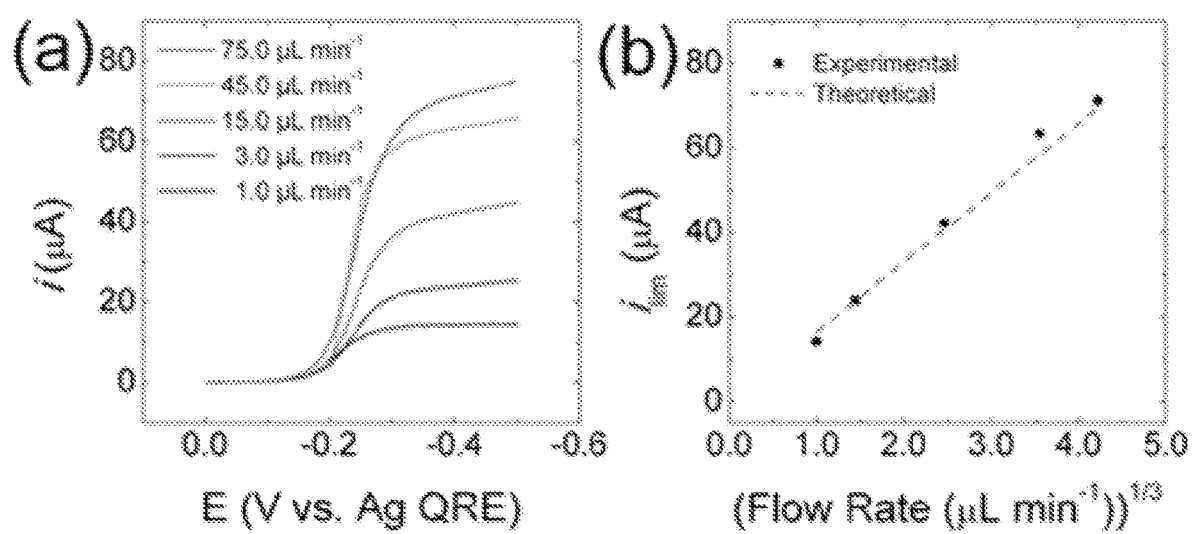
FIG. 4. (a) Linear sweep voltammograms for the reduction of 5.0 mM p-BQ in aqueous solutions of 0.10 M $KNO_3$ and 0.025 M KCl in the flow rate range of 1.0 to 75.0 μL $min^{-1}$. Electrode potential sweep rate: 50 mV $s^{-1}$. (b) Plot of limiting current (him) vs. cube root of volume flow rate. The black dots represent the experimental data points and the red dashed line is the theoretical correlation obtained using the Levich equation. An identically prepared single device was used for each measurement.

A perpendicular set of electrodes in a microchannel is not a common electrode arrangement in normal electrochemical practice. Therefore, it is essential to test whether this electrode set in a microchannel operates on classic electrochemical principles. FIG. 2 presents the configuration of the electrodes and microfluidic system used in this study. FIG. 4(a) presents a series of hydrodynamic linear sweep voltammograms of 5.0 mM p-benzoquinone (p-BQ). The electrochemical measurements were carried out in a three-electrode setup comprising a Au working electrode, Ag band counter electrode, and Ag QRE. A syringe pump was connected to the inlet using Teflon tubing in order to deliver the solution at a particular flow rate through the microchannel-assembled device. The experiments were performed while pumping an aqueous solution containing 5.0 mM p-BQ, 0.10 M $KNO_3$, and 0.025 M KCl through the microchannel at solution flow rates of 1.0 to 75.0 µL $min^{-1}$.

All of the voltammograms present similar characteristics in the reduction of p-BQ to hydroquinone at different solution flow rates. First, each voltammogram was obtained using a single device, and all of the voltammograms share a marginally similar onset potential at approximately −0.18 V. Second, steady-state cathodic limiting currents were observed throughout a wide range of solution flow rates. Third, the cathodic current increased with increasing solution flow rates. This behavior is generally consistent with expectations for electrochemical reactions in aqueous solutions at an electrode housed inside a microfluidic channel. FIG. 4(b) presents a plot of the limiting current ($i_{lim}$) versus the cube root of the volume flow rate. This plot was generated using the limiting current values at −0.40 V shown in FIG. 4(a). Note that the experimentally determined limiting currents follow the Levich equation, i.e., Equation (1).

$$i_{lim} = 0.925\, nFC_b D^{2/3} V_f^{1/3} \left(\frac{h^2 d}{4}\right)^{-1/3} w x_e^{2/3} \quad (1)$$

(Levich, V. G. Physicochemical Hydrodynamics, 2nd ed.; Prentice-Hall: Englewood Cliffs, N J, 1962.)

In Equation (1), n is the overall number of electrons transferred per molecule of electroactive species (in this case, p-BQ); F is the Faraday constant (96,485 C $mol^{-1}$); $C_b$ is the bulk concentration of p-BQ (5.0 mM); D is the p-BQ diffusion coefficient ($6.2 \times 10^{-6}$ $cm^2$ $s^{-1}$); $V_f$ is the volume flow rate; h and d are the height and width of the microchannel, respectively; $x_e$ is the length of the electrode (in the direction of flow); and w is the width of the electrode (equal to d in this case).

Each voltammogram presented in FIG. 4(a) was obtained from an individual device; therefore, device-to-device reproducibility is high using the electrode design and experimental conditions.

Coulometric Measurements and Length of Ag Band Electrode

The electrochemical behavior of the Ag-coated counter electrode was also studied, including its responses to the coulometry carried out on the working electrode. In a traditional three-electrode experiment, Faradaic reactions that occur at the counter electrode are ignored. However, it was found that if a layer of Ag is coated onto the counter electrode surface, the metallic Ag is oxidized if a reduction reaction is carried out on the working electrode. Because an electrochemical cell requires charge balancing between the working and counter electrodes, the charge that is needed for a reduction reaction to occur on the working electrode needs to be supplied from the counter electrode. In the disclosed system, the charge is supplied solely by the oxidation of the Ag on the band counter electrode.

More importantly, electrolysis of the supporting electrolyte solution can be prohibited. This phenomenon was confirmed in an electrochemical quartz crystal microbalance (EQCM) experiment to correlate the change of mass on the Ag-coated quartz crystal counter electrode with the charge consumed in the Faradaic reaction that was occurring on the working electrode surface. Details of this experiment and the relevant results are provided in FIG. 11.

In all of the flow experiments conducted in this study, the electrolyte solution contained 0.025 M of chloride ions ($Cl^-$). The purpose of introducing chloride ions was to prevent the Ag ions (AO that were generated from the oxidation of the metallic Ag from being freely diffused to the working electrode. In the presence of $Cl^-$ in the solution, the oxidation of the Ag led to the formation of AgCl (s) on the surface of the counter electrode and/or in the solution. The EQCM results show the mass loss (FIG. 11b) and indicate that the majority of the AgCl (s) was present in the solution as dispersion particles. In the absence of $Cl^-$ in the solution, the $Ag^+$ flowed downstream with the solution and were reduced on the working electrode, thereby affecting the electrochemical measurements of the reduction of the analyte species.

Figure 5:
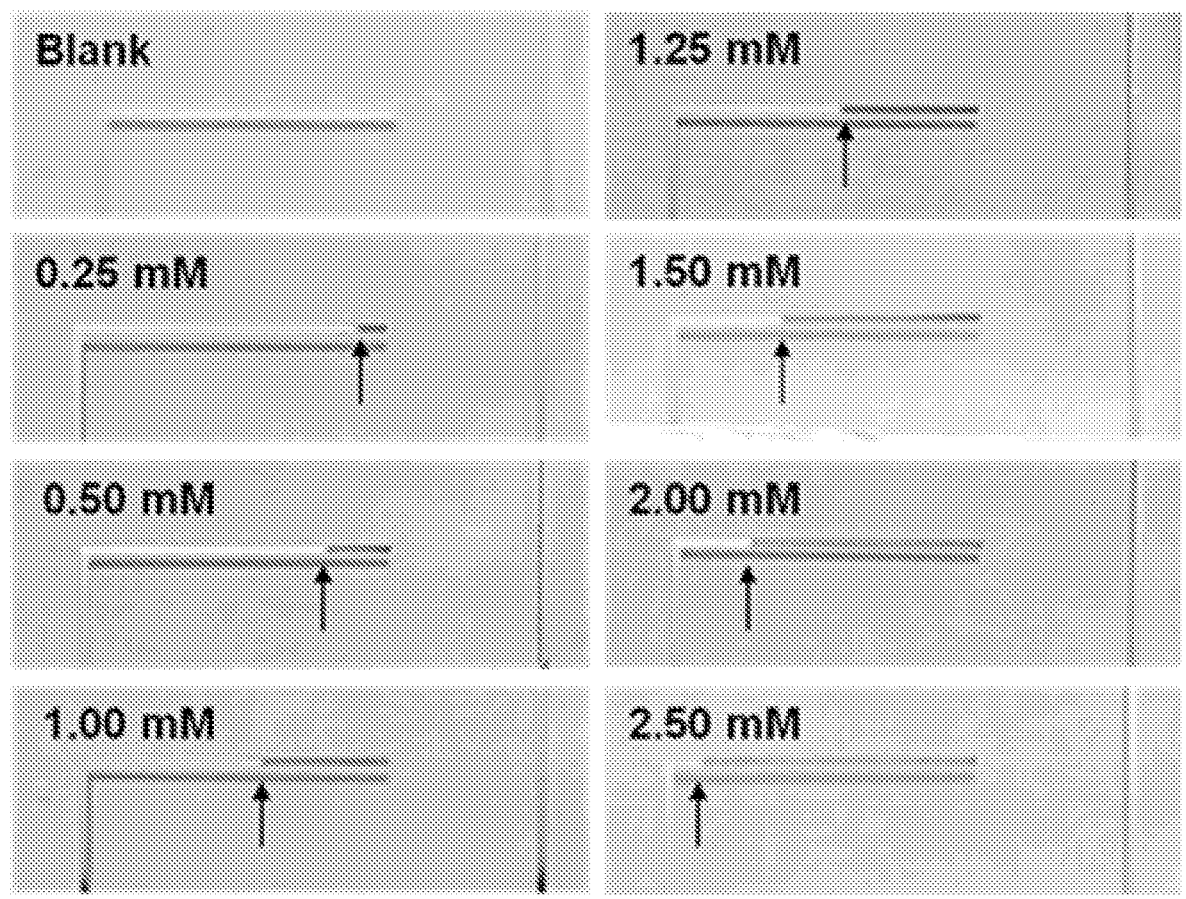
FIG. 5. Photographs of reacted Ag band electrodes during the reduction of p-BQ in concentrations ranging from 0.25 mM to 2.50 mM for 20 seconds.

FIG. 5 shows the response of the Ag-coated band counter electrodes when the potential of the working electrodes was held at −0.40 V while the p-BQ solutions in different concentrations (e.g., 0.25 to 2.50 mM) were passing through the microchannels at a constant solution flow rate of 45.0 µL $min^{-1}$. The photographs were taken 20 seconds after the potential was applied. As soon as the initial cathodic current for the p-BQ was observed in the amperometric measurement, the electro-oxidation of the Ag was initiated. For all instances, the Ag oxidation progressed from the anterior end of the Ag band toward its posterior along the band length.

Because of the color contrast between the metallic Ag and the underlying Ti/Au layer, the Ag oxidation and its extent can be easily observed.

Figure 6:
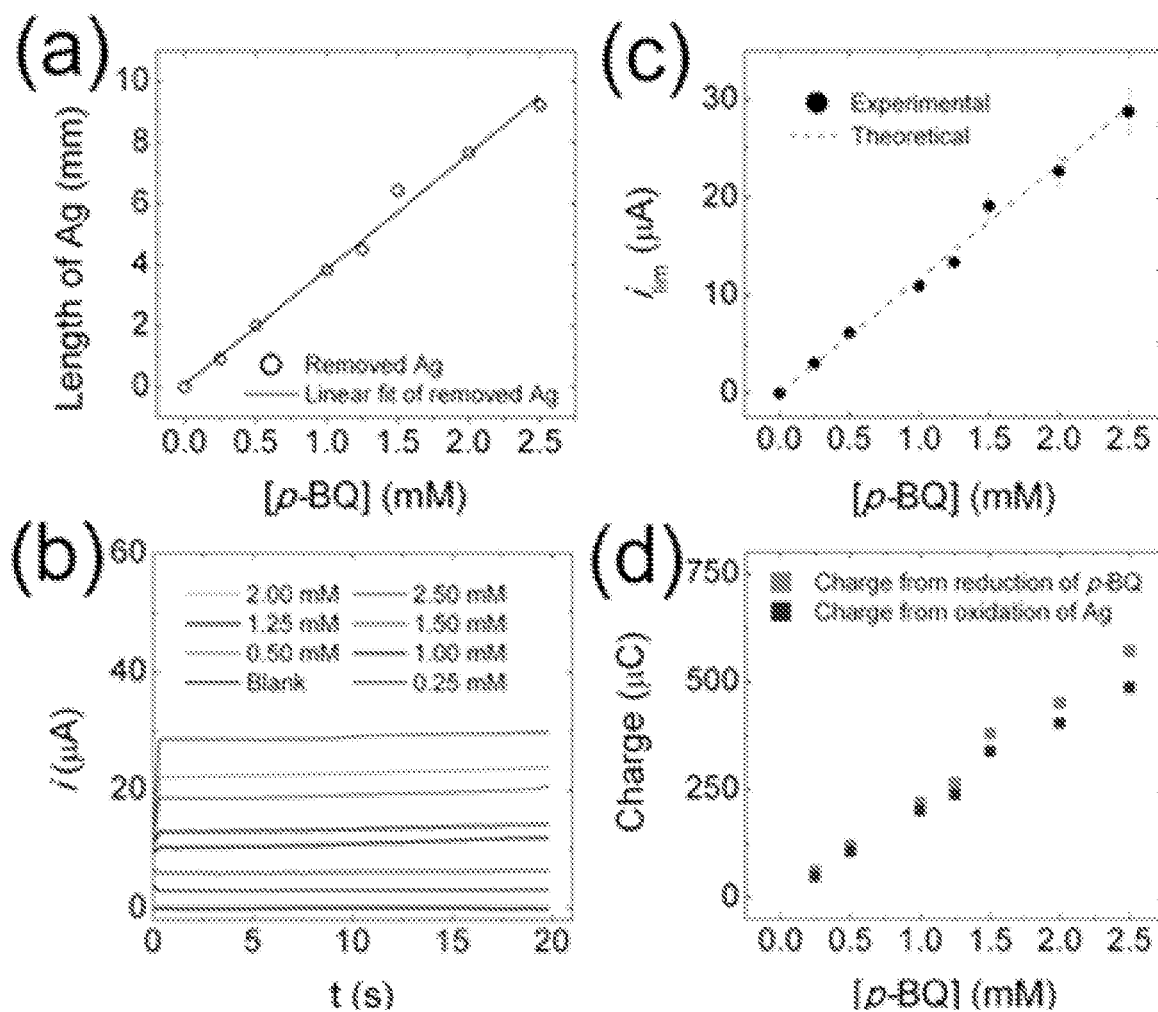
FIG. 6. (a) Plot of Ag band length vs. concentration of p-BQ. The open dots represent the data for the lengths of the removed Ag. (b) Plots of current (i) vs. time (t) for reduction of p-BQ at −0.40 V for 20 seconds in different concentrations. (c) Plot of limiting current ($i_{lim}$) vs. concentration of p-BQ. The black dots represent the experimental data and the red dashed line is the theoretical correlation obtained using the Levich equation. (d) Plots of cathodic (from analyte reduction) and anodic charges (from Ag oxidation) vs. p-BQ concentration. The measured charge of the entire Ag band, which was used to estimate the charge of the removed Ag, was 541.2 μC.

The resultant length of the electrode is highly quantitative. FIG. 6(a) shows a plot of the electro-oxidized Ag band length versus the p-BQ concentration. The data points for the length of the removed Ag were obtained from the photographs shown in FIG. 5 using ImageJ software. As shown in FIG. 6(a), the length of the removed Ag increases linearly with an increase in the p-BQ concentration. This result indicates that the resultant length can be correlated directly with the charge consumed in the reduction process at the working electrode and the concentration of the analyte.

To determine the charge associated with the length of the removed Ag, the charge for the entire length was first determined by employing a standard anodic stripping method. This stripping calibration experiment was carried out because the amount of Ag plays a key role in quantitatively reporting the electrochemical reaction that occurs at the working electrode, and thus, a slight variation in Ag thickness could significantly change the total charge value. The charge of the removed portion was estimated using the ratio of the removed Ag to the entire Ag band length and the total charge value for the entire Ag band.

FIG. 6(b) presents the hydrodynamic chronoamperograms that show the reduction of p-BQ at the working electrode. The experimental data presented in FIG. 5 and FIG. 6(b) were obtained concurrently. A steady-state feature for the measured current was observed at all concentrations. Depending on the concentration and flow rate, all the currents matched the expected values that were determined from the Levich equation, Equation (1).

A linear relationship was observed between the limiting current and the p-BQ concentration; see FIG. 6(c). By integrating the area under the i-t curve, shown in FIG. 6(b), the charge consumed during the reduction process could be determined. FIG. 6(d) shows the charges involved in the reduction of p-BQ compared with those estimated from the Ag oxidation at different concentrations. Both sets of charge values are in good agreement with each other over the wide concentration range. Therefore, it is clear that the Ag band electrode can quantitatively reflect the electrochemical reaction that has occurred at the working electrode.

Flow Rate Studies

Figure 7:
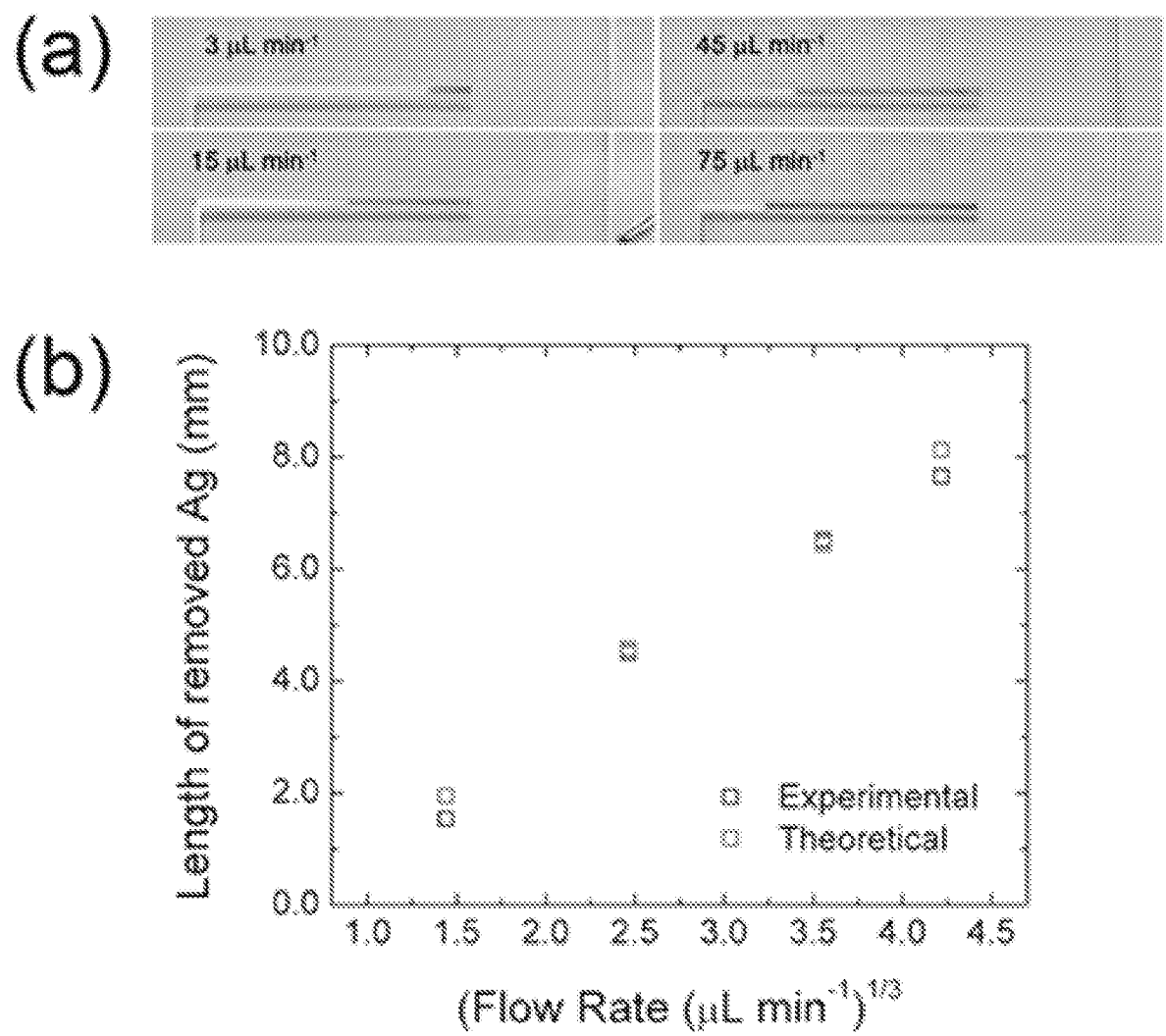
FIG. 7. (a) Photographs of Ag band counter electrodes after p-BQ was reduced at −0.40 V for 30 seconds. (b) Plots comparing theoretical and experimental lengths of removed Ag with respect to the cube root of the flow rate. The theoretical lengths were calculated using the coulombic charge for the reduction of 1.0 mM p-BQ at the relevant flow rate with the total charge for the entire length of a pristine Ag band. The experimental lengths were measured from the images shown in FIG. 7(a).

The solution flow rate also affects the magnitude of the coulombic charge per unit of time. Equation (1) shows that the limiting current is proportional to the cube root of the solution flow rate. Therefore, the accumulated charge would increase accordingly. FIG. 7(a) shows photographs of the Ag band as a function of the solution flow rate after the reduction of 1.0 mM p-BQ at −0.40 V for 30 seconds.

In all cases, the Ag oxidation progressed from the anterior end of the Ag band toward its posterior along the band length for all of the flow rates but at different oxidation rates. The observed oxidized Ag lengths are in good agreement with the theoretical values, as presented in FIG. 7(b). The theoretical removed Ag length was determined using the coulombic charge value that resulted from the reduction of p-BQ over the 30-second period. Theoretically, the charge that passes between the working and counter electrodes is consistent. Consequently, the charge observed from the reduction of the p-BQ should be equal in magnitude to the one for the oxidation of the Ag. Using this relationship, the theoretical lengths could be calculated and compared with the experimental lengths that were determined from FIG. 7(a). This experiment again demonstrates that Ag oxidation is the sole electrochemical reaction that occurs at the counter electrode.

Silver Band Reporting for Biosensing Applications

To illustrate the biosensing capability of the device design, a series of biosensing experiments were carried out using a model analyte, which is an avidin-HRP conjugate. This conjugate is used most commonly in immunological and nucleic acid hybridization assays as a redox label. The specific interaction between biotin and avidin allows different combinations of sensing components. (Wilchek, et al. 1988 Anal. Biochem. 171, 1-32; Diamandis, et al. 1991 Clin. Chem. 37, 625-636.)

Therefore, the avidin-HRP conjugate was employed as the model analyte in the study. In an enzymatic reaction with HRP, $H_2O_2$ is enzymatically reduced to $H_2O$ by the HRP, and the reduced form of TMB ($TMB_{red}$) is concurrently oxidized to its oxidized form ($TMB_{ox}$). (Ghindilis, et al. 2007 Biosens. Bioelectron. 22, 1853-1860.) Due to the close proximity of HRP to the electrode surface, $TMB_{ox}$ can be reduced electrochemically on an electrode surface. The total charge obtained from the reduction of $TMB_{ox}$ is reflected by the resultant length of the Ag counter electrode.

Figure 9:
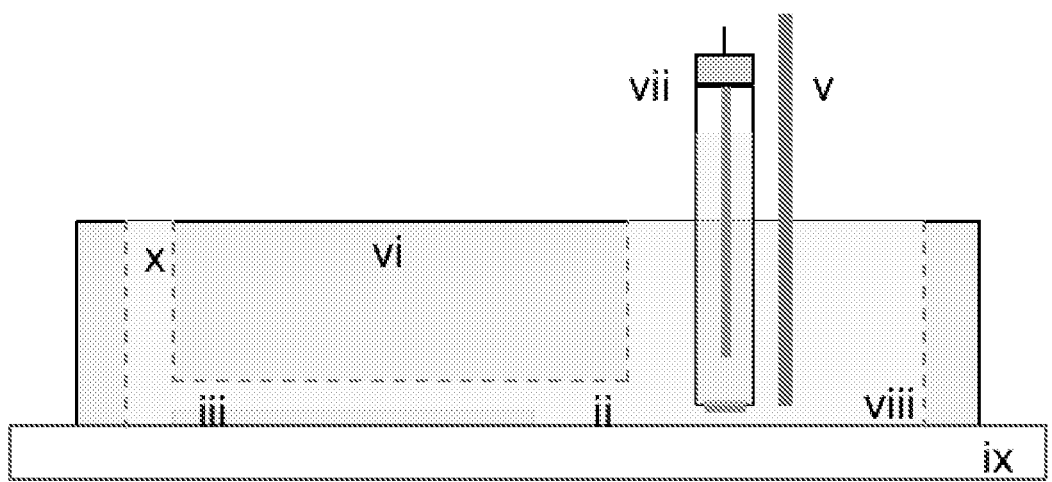
FIG. 9. Scheme of experimental setup: (x) inlet, (iii) ITO band electrode, (vi) PDMS block, (ii) microchannel, (vii) Ag/AgCl reference, (v) Pt wire, (viii) reservoir, (ix) glass substrate.

In this experiment, T-DNA-B was first immobilized on a 2-mm diameter Au electrode surface. Then, 40.0 µL of the model analyte was allowed to react with the electrode that had been modified with T-DNA-B. Because the model analyte has an avidin group, it binds specifically to the biotin. Next, this electrode was transferred to a microfluidic device optimized for this experimental testing. The experimental setup is illustrated in FIG. 9.

Briefly, a Ag band counter electrode was housed inside a microchannel filled with 0.10 M $KNO_3$ and 0.025 M KCl. The working electrode modified with the model analyte was placed in a polypropylene tube inside the reservoir at the end of the microchannel. The bottom of the tube was made with a salt-saturated agar gel; its role was to prevent the analyte solution from being mixed with the solution in the reservoir and microchannel. Thus, the two solutions were separated spatially from each other but were connected electrochemically. Then, 0.5 mL of 0.42 mM TMB and 1.3 mM $H_2O_2$ were added to the tube. A constant potential of 0.0 V (vs. Ag QRE) was applied to the working electrode for 30 seconds. The Ag oxidation on the counter electrode was recorded simultaneously.

Figure 8:
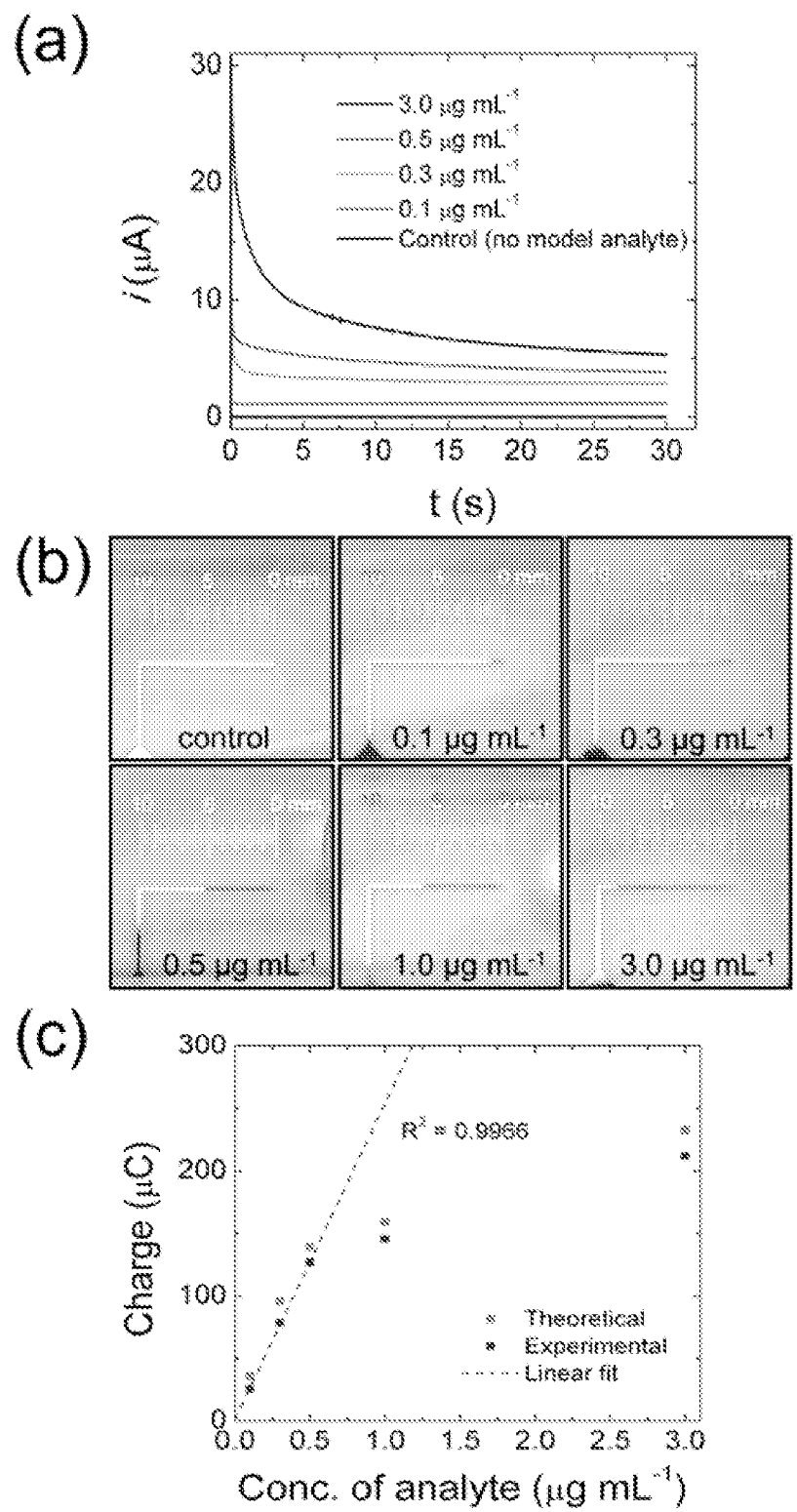
FIG. 8. (a) Plots of current (i) vs. time (t) for reduction of $TMB_{ox}$ at 0.0 V (vs. Ag QRE) after the Au disk electrode surfaces were modified with different concentrations of the model analyte ranging from 0.1 μg $mL^{-1}$ to 3.0 μg $mL^{-1}$. (b) Photographs of Ag band electrodes obtained from tests for the reduction of $TMB_{ox}$, varying the amounts of the model analyte. (c) plot comparing theoretical (i.e., coulombic charge for reduction of $TMB_{ox}$) and experimental charges (i.e., estimated charge for Ag electro-oxidation) with respect to the concentration of the model analyte. The theoretical and experimental charges were estimated using the results presented in (a) and (b), respectively.

FIG. 8(a) shows the i-t curves for the Au disk electrodes that were modified using model analyte suspensions in concentrations of 0.1 µg $mL^{-1}$ to 3.0 µg $mL^{-1}$. The current obtained from the reduction of the enzymatically generated $TMB_{ox}$ increased with an increase in the model analyte concentration. As soon as the potential was applied to the working electrode, the oxidation of the Ag was observed immediately. The oxidation process stopped as soon as the potential that was applied to the working electrode stopped. The device used for this study has a patterned ruler on its glass substrate. Therefore, the outcomes can be determined directly using only the naked eye. In this experiment, the current measurements were taken using a potentiostat under stationary conditions while the oxidation process was video-recorded in 'movie' mode using a smartphone camera.

FIG. 8(b) presents photographs of the resulting Ag band electrodes that had been used for the detection of the different model analyte concentrations. This figure shows that the higher the concentration of the model analyte that was bound to the working electrode, the more Ag was removed from the Ag band electrode over a fixed time period. The charge associated with the oxidation of the Ag band electrode is compared with that of the reduction of the $TMB_{ox}$ in FIG. 8(c).

As shown in FIG. 8(c), the charges obtained from those electrochemical processes closely agree with each other. These results prove that Ag oxidation is the sole electrochemical process that occurred at the counter electrode. Therefore, the removed portion of the Ag band counter electrode can quantitatively represent the concentration of the model analyte that is detected on the working electrode. Between 0.1 μg $mL^{-1}$ and 0.5 μg $mL^{-1}$, the charge for the reduction of $TMB_{ox}$ linearly increases with increasing concentrations of the model analyte with a sensitivity of 252.97 μC/μg $mL^{-1}$. The nonlinear part of the curve could be due to 1) the use of fixed amounts of $H_2O_2$ and TMB and/or 2) the biotinylated electrode surface becoming saturated with the model analyte.

Another interesting aspect of this experiment is that the chemicals used for the sensing reaction were both physically and chemically isolated from the microfluidic device by the agar gel at the bottom end of the tube (i.e., an analyte solution compartment). The agar gel also served as a salt bridge to connect the microfluidic device and a commercial standard-size electrode electrically. Therefore, the results from this experiment suggest that the Ag band electrode can be coupled not only with electrodes in different dimensions but also with sensing measurements in diverse analyte solutions.

Chemicals and Materials p-benzoquinone (p-BQ) (reagent grade, ≥98%) was purchased from Sigma Aldrich (Milwaukee, Wis.). Tris(2,2'-bipyridyl) dichlororuthenium(II) hexahydrate (Ru(bpy)$_3Cl_2$.6$H_2O$, bpy=2,2'-bipyridine) was purchased from Strem Chemicals (Newburyport, Mass.). Tripropylamine (TPrA) was obtained from Sigma Aldrich (Milwaukee, Wis.). A phosphate buffer saline (10×, PBS) was obtained from Fisher Scientific. An acetate buffer (pH 5.5) was prepared using acetic acid (≥99.9%, Sigma Aldrich) and sodium acetate (ACS reagent, ≥99.0%, Sigma Aldrich). Thiol and biotin-bifunctionalized oligonucleotide, T-DNA-B (5' d thiol C6 SS-ACATTAAAATTC-Biotin 3') were purchased from Bioresearch Technologies (Petaluma, Calif.) and diluted in TE buffer (10 mM Tris-HCl/1 mM EDTA). Horseradish peroxidase-conjugated avidin (HRP-avidin) was obtained from 1VIP Biomedicals (Solon, Ohio); it was dispersed in an enzyme buffer (Thermo Scientific): 50 mM Tris.HCl, 10 mM $MgCl_2$, 100 mM NaCl, 0.02% Triton X-100, and 0.1 mg $mL^{-1}$ bovine serum albumin (BSA) (1× buffer composition). Also, 3, 3', 5, 5'-tetramethylbenzidin (TMB) was obtained from Acros Organic. Deionized water (18 MS/cm) was used to prepare all the aqueous solutions. Polydimethylsiloxane (PDMS) channels were prepared using a Sylgard 184 elastomer kit obtained from K. R. Anderson, Inc. (Morgan Hill, Calif.). Sterling Ag tubing (OD 0.05", ID 0.030") was purchased from Starr Gems, Inc. (Tuscan, Ariz.) and used as a quasi-reference electrode (QRE) for the convenience of miniaturization. All chemicals and materials were used without further purification. All electrochemical measurements were carried out using a WaveNow USB potentiostat (Pine Instruments, Durham, N.C.).

Electrode Fabrication

The gold (Au) working electrode and the silver (Ag) band electrode used in this study were fabricated using conventional photolithography. Briefly, a layer of positive photoresist (1.3 μm thick, MICROPOSIT 1813) was spin-coated on a four-inch diameter glass wafer. Next, the photoresist layer was patterned using a mask aligner by illuminating the photoresist with ultraviolet (UV) light through a negative photomask printed with the electrode patterns (CAD/Art Services, Brandon, Oreg.). These patterns were then transferred to the wafer in a developer solution (MICROPOSIT MF-321) after the exposed resist was removed. Titanium (Ti) (5-nm thick adhesion layer) and Au (100-nm thick) were deposited sequentially using an electron beam deposition technique, and the Ti/Au patterns were obtained by lift-off. The Ti (5-nm thick) and Ag (ca. 30-nm thick) were deposited sequentially via electron beam and thermal evaporation techniques, respectively, only on the Ag band electrode area.

Electrogenerated Chemiluminescence (ECL) Imaging

For the ECL experiments, an indium tin oxide (ITO) band electrode was fabricated on an ITO-coated glass slide (25× 50×0.7 mm, $R_s$=70-100Ω, Delta Technologies, Loveland, Colo.) by photolithography, as described above, using the positive photomask with the band electrode pattern. The UV-exposed area was developed and then etched using an aqueous solution of 5% $HNO_3$ and 20% HCl (by volume), leaving the ITO band electrode on the slide. Copper wires were attached to the contact pads of the band electrodes using conductive Ag epoxy resin. The ITO band electrode was used as the working electrode. The counter electrode was a 2-mm diameter Au disk electrode, and the reference electrode was Ag/AgCl (1 M KCl). FIG. 9 illustrates the design of the experimental setup. The ITO band electrode was housed in the microchannel as described in the experimental section. The counter and reference electrodes were placed in a circular reservoir (ca. 1.0 cm dia.) that was made at the outlet reservoir site. The microchannel was filled with $Ru(bpy)_3^{2+}$ and TPrA, and a potential of 1.4 V against the Ag/AgCl reference electrode was applied to the ITO band electrode inside the microchannel.

Experimental Device Setup for Detection of HRP-avidin

Figure 10:
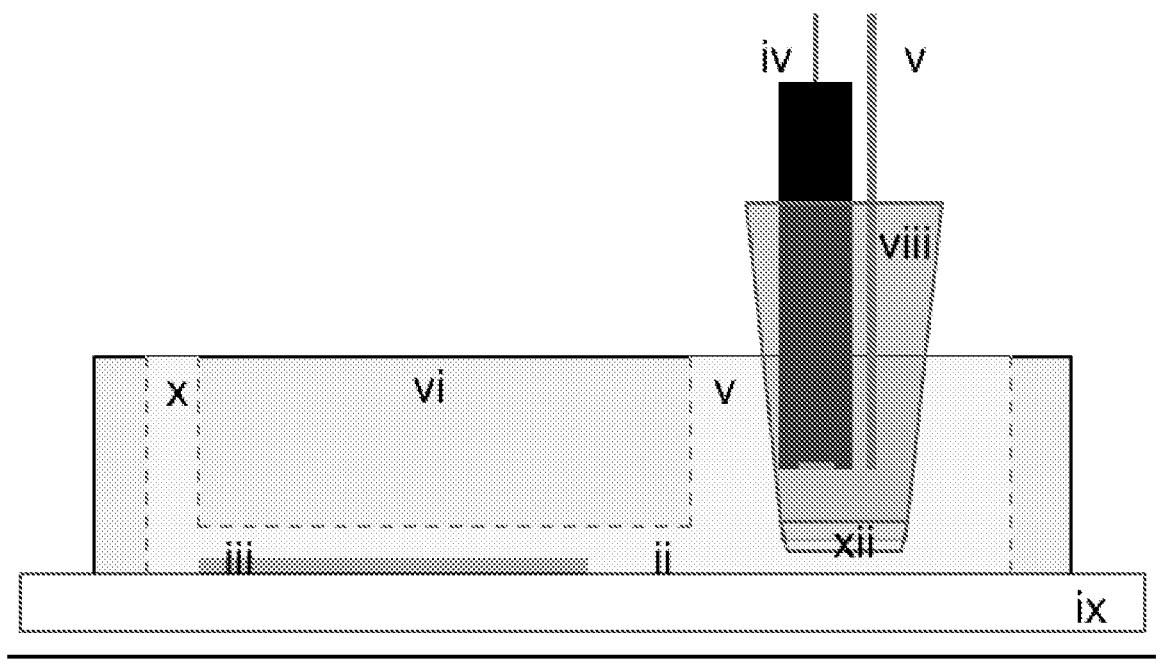
FIG. 10. Schematic representation of device setup for detection of a model analyte, HRP-avidin: (x) inlet for introduction of supporting electrolyte into microchannel, (iii) Ag band electrode, (vi) PDMS block, (ii) microchannel, (v) 1-cm diameter reservoir, (iv) working electrode modified with HRP-avidin, (v) Ag QRE, (viii) polypropylene micro-tube filled with reduced form of TMB solution, (xii) agar gel tip, and (ix) glass substrate. (Note: The dimesnsions are not to scale).

The microchannel electrode device was assembled using a polydimethylsiloxane (PDMS) block with a 1-cm diameter reservoir (FIG. 10). The Ag band electrode was placed inside the microchannel. The HRP-modified Au electrode and Ag quasi-reference electrode (QRE) were placed in a 2-mL polypropylene microtube with an agar gel tip at the bottom end. The thickness of the agar gel was typically 3 mm. The agar gel planes (i.e., the top and bottom surfaces) were rinsed thoroughly with corresponding electrolyte solutions prior to being placed in the reservoir, because the top and bottom planes of the agar gel faced different electrolyte solutions during the measurements. An aqueous solution of 0.1 M $KNO_3$ and 0.025 M KCl was injected into the microchannel and reservoir. The microtube was filled with 0.5 mL of 0.10 M acetate buffer containing 1.6% (v/v) dimethyl sulfoxide at pH 5.5 plus 0.42 mM TMB and 1.3 mM $H_2O_2$. The current was monitored and recorded at a constant potential of 0.0 V (vs. Ag QRE) for 30 seconds in a stationary condition. The coulombic charge that resulted from the reduction of the enzyme-generated $TMB_{ox}$ was calculated by integrating the current over time.

Electrochemical Quartz Crystal Microgravimetry (EQCM)

A WaveNow potentiostat was connected to a quartz crystal microbalance (QCM 200, Stanford Research Systems) for the EQCM experiments. A layer of Ag was deposited electrochemically onto a Au-plated quartz crystal surface from an aqueous 0.10 M $AgNO_3$ solution, as described in the literature (Xie, et al. 2007 *J. Chem. Edu.* 84, 681-684). The resulting Ag-deposited crystal was used as the counter electrode for the electrochemical measurements. Electrochemical quartz crystal microgravimetry (EQCM) and chronoamperometry were carried out concurrently on a Ag-deposited crystal and a 2-mm diameter Au disk electrode, respectively. The mass change on the crystal was monitored using QCM while 10.0 mM p-benzoquinone (p-BQ) in 0.1 M $KNO_3$ and 0.025 M KCl aqueous solution was being reduced using chronoamperometry in a three-electrode setup. In this case, the Au electrode and the Ag deposit were the working and counter electrodes, respectively. A Ag/AgCl, 1 M KCl(aq) electrode was used as the reference electrode.

Figure 11:
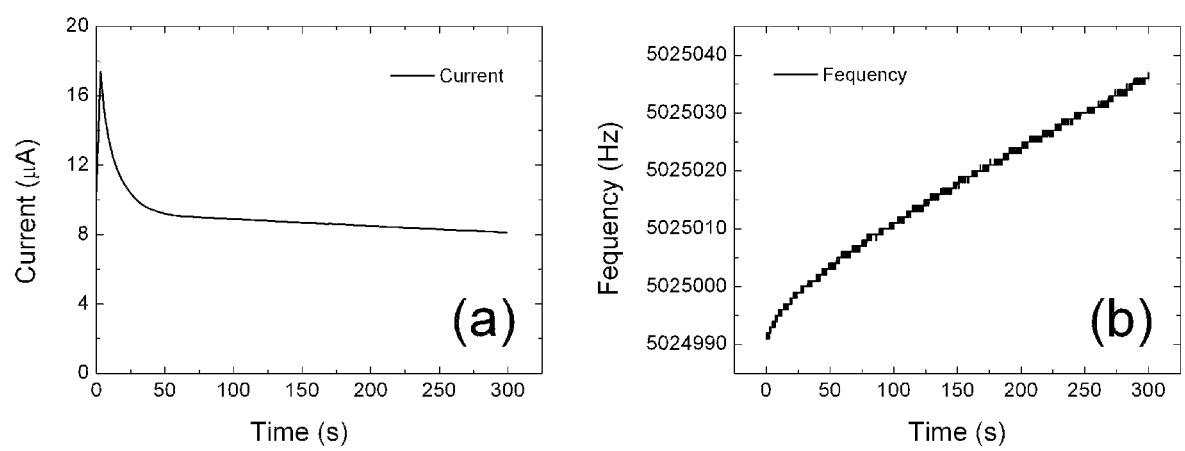
FIG. 11. (a) Current vs. time curve recorded from the reduction of 10.0 mM p-BQ for 5 minutes at the Au working electrode with applied potential of 0.1 V (vs. Ag/AgCl, 1 M KCl). (b) Frequency vs. time plot obtained from oxidation of Ag on quartz crystal surface.

FIG. 11 Assuming that the charge associated with the reduction in p-BQ is equal to that of the oxidation of the Ag, the theoretical value of the Ag loss can be calculated to be 1,480 ng. The corresponding experimental value was calculated using the Sauerbrey equation, Equation (2):

$$\Delta f_o = -C_f \Delta m \qquad (2)$$

where $\Delta f_o$, $C_f$, and $\Delta m$ are the resonant frequency changes of a piezoelectric quartz crystal, calibration constant, and mass change, respectively.

The experimental value of the Ag loss was 1,278 ng, which is close to the theoretical loss. These results indicate that an electrochemical reaction that is measured on a working electrode can be correlated with the electrooxidation of Ag on a counter electrode.

Ag Band Electrode Characterization

Cyclic voltammetry was carried out to estimate the apparent charge of the Ag film that was present on the counter electrode using anodic stripping analysis of the metal Ag. In a stationary three-electrode measurement, the voltammogram was obtained in an aqueous supporting electrolyte composed of 0.1 M $KNO_3$ and 0.025 M KCl by cycling the potentials from −0.1 V to 0.5 V at a sweep rate of 20 mV s$^{-1}$. A Ag band electrode was immersed entirely in the electrolyte solution. A Pt wire as the counter electrode and Ag/AgCl, 1 M KCl as the reference electrode were used.

Figure 12:
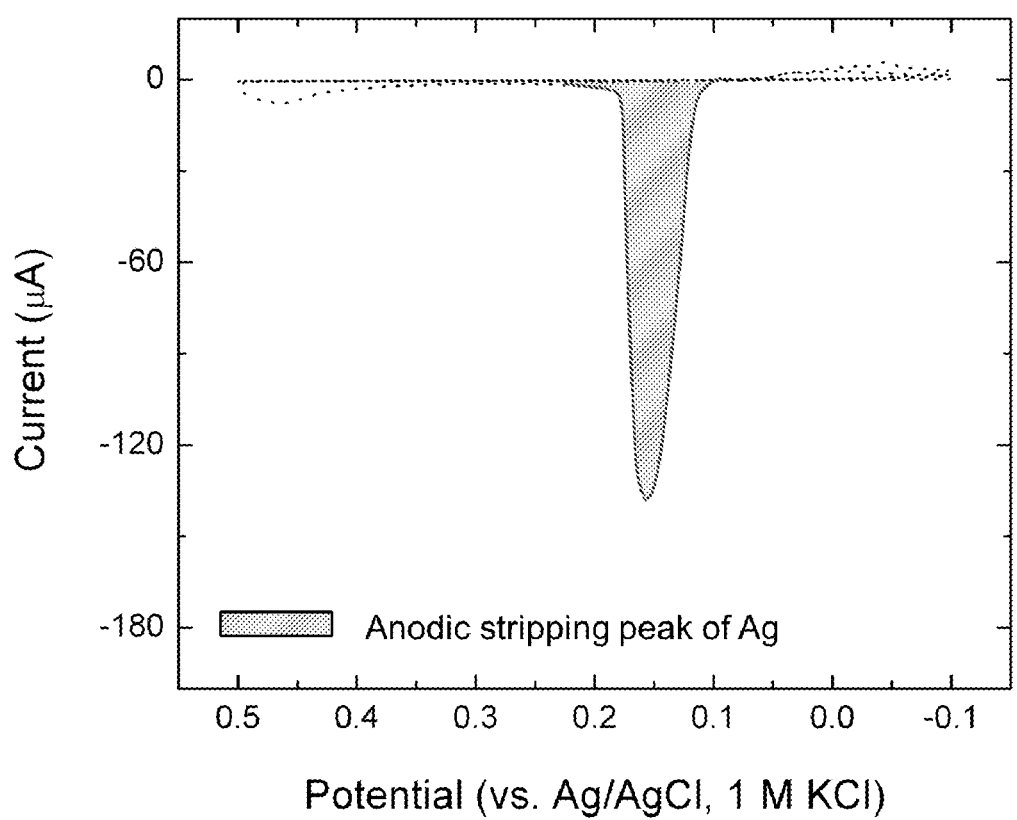
FIG. 12. Cyclic voltammogram for anodic stripping of Ag band (10.25 cm in length) with a scan rate of 20 mV $s^{-1}$ in aqueous supporting electrolyte composed of 0.1 M $KNO_3$ and 0.025 M KCl.

An example of the resulting voltammograms is shown in FIG. 12. The one major stripping peak that was centered at around 0.17 V in the first forward scan represents the electrochemical oxidation of the metallic Ag. Ag oxidation was not observed in the second forward scan, verifying the complete oxidation of the Ag in the first forward scan. In this particular example, the coulombic charge associated with the Ag oxidation was estimated to be 276.4 μC per 10.25 mm of the Ag band.

This electrochemical method was used to characterize each batch of Ag band electrodes because it eliminates the need to use the Ag film thickness, morphology, or density to determine the charge associated with the electro-oxidation reaction. Two batches of Ag band electrodes (referred to as Batch #1 and #2, respectively, hereinafter) were prepared for the work reported in this article. Batch #1 and Batch #2 were used to obtain the results presented in FIGS. 5 to 7 and FIG. 8, respectively. The measured charges of the entire Ag bands via the stripping voltammetry were 541.2 μC for Batch #1 and 276.4 μC for Batch #2, respectively. The charge associated with the removed Ag was calculated by multiplying the measured charge per the entire Ag band length by the removed band length.

Device Fabrication

The electrodes were fabricated using conventional microfabrication procedures.[35] Briefly, the electrode patterns for the working and counter electrodes were introduced to a glass wafer surface by photolithography. Both of the electrodes, which were prepared via a lift-off process, were composed of 5-nm thick titanium (Ti) and 100-nm thick gold (Au). Next, the band electrode was subjected to another lift-off procedure; the 5-nm thick Ti and ca. 30-nm thick Ag were deposited sequentially on top of the Au surface. Copper wires were attached to the contact pads of the device for the electrical contacts.

Polydimethylsiloxane (PDMS) microchannels were prepared by following a replica molding procedure described in the literature. (Xia, et al. 1998 *Angew. Chem. Int. Ed.* 37, 550-575.) All the microchannels used in this study were 20 μm high×1250 μm wide×3.0 cm long. The PDMS mold was exposed to air plasma for 45 seconds and assembled with an electrode substrate under an optical microscope so that the entire Ag band electrode was positioned centrally between the channel sidewalls. The assembled device was then placed on a hot plate at 80° C. for five minutes to promote permanent bonding. (Duffy, et al. 1998 *Anal. Chem.* 70, 4974-4984.)

A syringe pump (Harvard Apparatus, Holliston, Mass.) was connected to the reservoir (i.e., inlet) near the Ag band electrode using Teflon tubing to control the flow rate of the solution inside the microchannel. A steady-state condition was desired to facilitate comparisons of the experimental data, because explicit quantitative comparisons between the cathodic reaction on the working electrode and the anodic reaction on the counter electrode were made in the study.

Electrogenerated Chemiluminescence (ECL) Imaging

In this set of experiments, the band electrode was fabricated using a transparent indium tin oxide (ITO) slide. A Pt wire and Ag/AgCl (1 M KCl) electrode were used as the counter and reference electrodes, respectively. Both of the electrodes were obtained from CH Instruments (Austin, Tex.). The counter and reference electrodes were placed in the reservoir at the outlet of the microchannel. The emission of ECL from the band electrode was monitored using a Zeiss observe A1 inverted microscope equipped with a charge-coupled device (CCD) camera (QuantEM: 512SC, Photometrics). (FIG. 9).

Electrode Modification for Detection of Model Analyte

In this design, a 2-mm diameter Au electrode was modified with thiol- and biotin-bifunctionalized DNA (T-DNA-B) for the detection of a model analyte, i.e., horseradish peroxidase (HRP)-avidin, following the modification of a procedure found in the literature.[38] 1.0 T-DNA-B was prepared in a TE buffer (10 mM Tris-HCl/1 mM EDTA) containing 5.0 mM TCEP for the reduction of the disulfide bond. The polished and $N_2$-dried Au electrode was then modified with 50.0 μL of 1.0 μM T-DNA-B in a 90% humidity chamber. After one hour, the DNA-modified electrode was rinsed with deionized (DI) water for 15 seconds. Next, 50.0 μL of 1.0 mM aqueous 6-mercaptohexanol was placed on the rinsed electrode for one hour to fill the voids within the DNA monolayer. The electrode was rinsed again with DI water for 15 seconds. Then, 50.0 μL of enzyme buffer containing 1% bovine serum albumin (BSA) was placed on the electrode surface for 15 minutes to prevent the nonspecific adsorption of the HRP-avidin. Five different HRP-avidin suspensions with 0.1, 0.3, 0.5, 1.0, and 3.0 micrograms per milliliter, respectively, were prepared in the enzyme buffer. 40.0 μL of each HRP-avidin suspension was placed for 30 minutes on each DNA-modified electrode that had been processed individually, as described above. Finally, each electrode was rinsed with 0.1 M phosphate-buffered saline (PBS) followed by DI water for 30 seconds.

Enzyme-Modified Electrodes

In this experiment, the test devices were assembled using PDMS blocks, each having a 1-cm diameter reservoir. These PDMS blocks were identical to those used in the ECL experiments. The Ag band electrode was located inside the microchannel as described above. The microchannel was filled with an aqueous solution of 0.10 M $KNO_3$ and 0.025 M KCl. The modified Au disk electrode and Ag quasi-reference electrode (QRE) were placed in a separate compartment from the microchannel. The separate compartment was then filled with 0.5 mL of 0.10 M acetate buffer containing 1.6% (v/v) dimethyl sulfoxide at pH 5.5 plus 0.42 mM tetramethylbenzidine (TMB) and 1.3 mM $H_2O_2$. A schematic representation of the test device is given in FIG. 10. The current was monitored and recorded at a constant potential (0.0 V vs. Ag QRE) for 30 seconds under stationary conditions. The charge associated with the reduction of the enzyme-generated TMB (i.e., oxidized TMB, $TMB_{ox}$) was calculated by integrating the current over time.

To Convert the Sensing Platform from Three-Electrode Setting into Two-Electrode Setting In order to use batteries to operate the sensing platform, the sensing platform from three-electrode was configured to a two-electrode configuration. In three-electrode configuration, the sensing platform consists of a Ag band counter electrode, a working electrode, and a reference electrode. In contrast, in two-electrode configuration, the sensing platform consists of a Ag band counter electrode and a working electrode. The reference electrode is eliminated in this configuration.

To determine the voltage needed to apply between the working and counter electrodes in two-electrode configuration for a sensing reaction, first is to determine the voltage applied to the working and counter electrodes when a potential (voltage vs. a reference electrode) is set for a sensing reaction on the working electrode. This concept was demonstrated by filling a microchannel with 1.0 mM p-bezoquinone (p-BQ) at 15 uL/min using a syringe pump and a potential of −0.4 V vs. Ag QRE was applied to the working electrode. Over the course of the experiment, a multimeter was used to measure the voltage difference between the Ag band counter and the working electrodes. It was found that the voltage difference between the two electrodes ranges from 1.6-2.8 V. The importance of this experiment is that the potentiostat applies roughly 3 V in order to activate both oxidation of Ag and reduction of p-BQ under the experimental conditions.

After that, two 1.5 V AA batteries were used to repeat the same experiment in a two-electrode device (without the reference electrode). Two AA batteries provide 3.0 V to Ag counter and working electrodes. FIG. 13a shows the result obtained with a three-electrode configuration device after −0.4 V vs. Ag QRE for 20 seconds. FIG. 13b shows the result obtained with a two-electrode configuration device after 3.0 V applied to the electrodes for 20 seconds.

Figure 13:
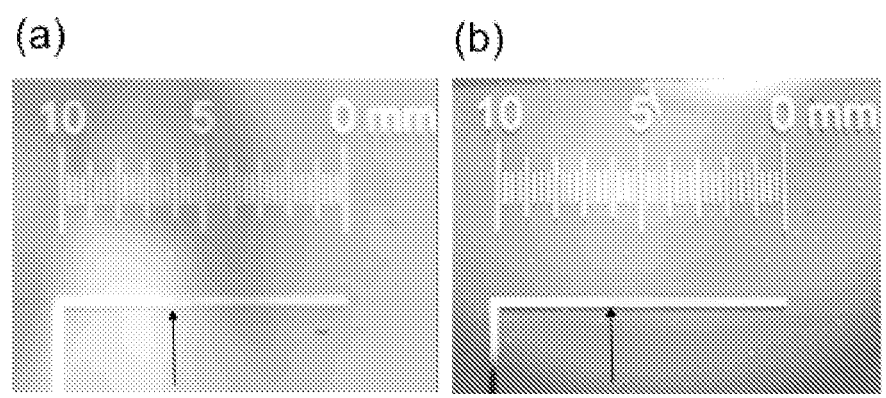
FIG. 13. Photographs of the resulting Ag band electrodes obtained from (a) a three-electrode configuration device and (b) a two-electrode configuration device after 20 seconds of voltage applied to the electrodes for the reduction of 1.0 mM p-BQ.
Figure 14:
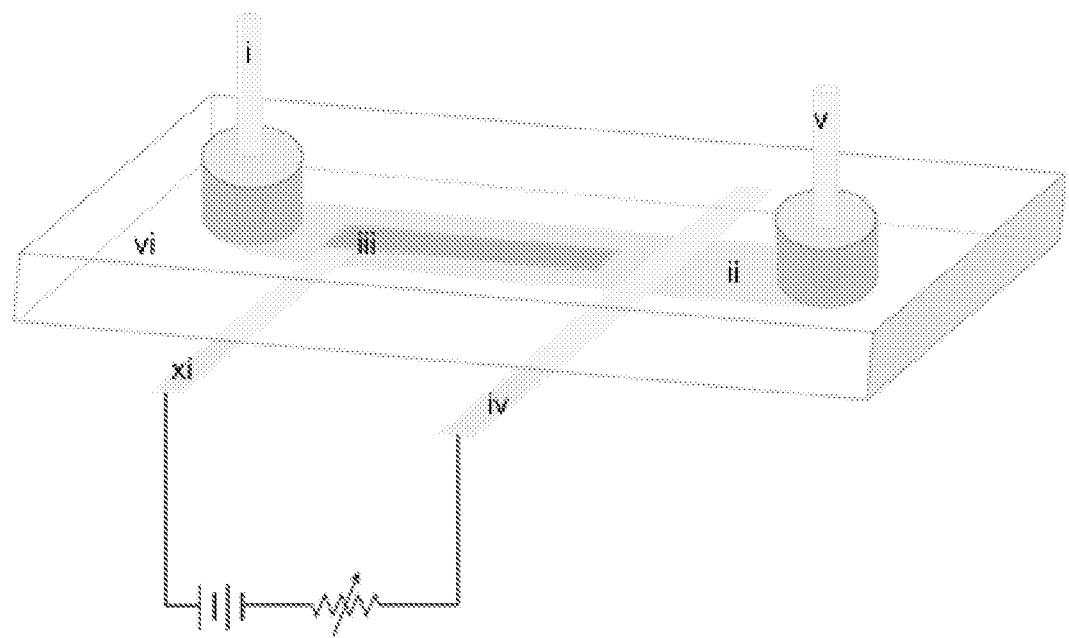
FIG. 14. Schematic representation of battery powered two-electrode device setup for detection of p-BQ: (i) inlet for introduction of the analyte into microchannel, (vi) PDMS block, (xi) counter electrode, (iii) Ag band electrode, (iv) working electrode, (ii) microchannel, and (v) microchannel outlet. (Note: The dimensions are not to scale).

FIG. 13 shows that the resulting lengths of the Ag band electrodes are the same when −0.4 V vs. Ag QRE is applied to the three-electrode configuration device and 3.0 V is applied to the two-electrode configuration. The importance of this experiment is that it shows that the electrochemical signal reporting method works in both three-electrode and two-electrode configurations. More significantly, the electrochemical signal report method works with only batteries without any instrumentation, such as a potentiostat. It is noteworthy to mention that batteries and resistors can be connected together to create any voltage needed for any sensing reaction using the two-electrode configuration device.

Video Recording

The time progression of the Ag band electrode was recorded during the reduction process of the $TMB_{ox}$ (i.e., oxidized TMB) on the modified Au surface using a smartphone camera (Samsung Galaxy S5 Active) in normal camcorder mode with a resolution of 3840×2160 pixels at a frame rate of 30 fps. The distance between the device and the camera was approximately 15 cm. A snapshot of the Ag band was obtained from the video at a time point of 30 seconds after the potential of 0.0 V (vs. Ag QRE) was applied. An enlarged snapshot image is presented in this article to help compare the length of the amount of Ag that has been removed from the surface of the electrode.

Applicant's disclosure is described herein in preferred embodiments with reference to the Figures, in which like numbers represent the same or similar elements. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

The described features, structures, or characteristics of Applicant's disclosure may be combined in any suitable manner in one or more embodiments. In the description herein, numerous specific details are recited to provide a thorough understanding of embodiments of the invention. One skilled in the relevant art will recognize, however, that Applicant's composition and/or method may be practiced without one or more of the specific details, or with other methods, components, materials, and so forth. In other instances, well-known structures, materials, or operations are not shown or described in detail to avoid obscuring aspects of the disclosure.

In this specification and the appended claims, the singular forms "a," "an," and "the" include plural reference, unless the context clearly dictates otherwise.

Unless defined otherwise, all technical and scientific terms used herein have the same meaning as commonly understood by one of ordinary skill in the art. Although any methods and materials similar or equivalent to those described herein can also be used in the practice or testing of the present disclosure, the preferred methods and materials are now described. Methods recited herein may be carried out in any order that is logically possible, in addition to a particular order disclosed.

INCORPORATION BY REFERENCE

References and citations to other documents, such as patents, patent applications, patent publications, journals, books, papers, web contents, have been made in this disclosure. All such documents are hereby incorporated herein by reference in their entirety for all purposes. Any material, or portion thereof, that is said to be incorporated by reference herein, but which conflicts with existing definitions, statements, or other disclosure material explicitly set forth herein is only incorporated to the extent that no conflict arises between that incorporated material and the present disclosure material. In the event of a conflict, the conflict is to be resolved in favor of the present disclosure as the preferred disclosure.

EQUIVALENTS

The representative examples are intended to help illustrate the invention, and are not intended to, nor should they be construed to, limit the scope of the invention. Indeed, various modifications of the invention and many further embodiments thereof, in addition to those shown and described herein, will become apparent to those skilled in the art from the full contents of this document, including the examples and the references to the scientific and patent literature included herein. The examples contain important additional information, exemplification and guidance that can be adapted to the practice of this invention in its various embodiments and equivalents thereof.

What is claimed is:

1. A microfluidic sensing device, comprising:
   a channel having an inlet and an outlet for ingress and egress of a liquid sample and a diameter or width in a range of about 1 μm to about 10 mm;
   a band electrode comprising, sequentially, a first titanium (Ti) layer, a gold (Au) layer, a second titanium (Ti) layer and a silver (Ag) layer, longitudinally disposed in the channel; and
   a working electrode disposed across the channel and perpendicular to the band electrode.

2. The microfluidic sensing device of claim 1, further comprising a reference electrode, wherein the reference electrode is made of or coated with Ag, platinum, aluminum, carbon, or silver/silver chloride (Ag/AgCl), or a mixture thereof.

3. The microfluidic sensing device of claim 2, wherein the working electrode comprising a titanium (Ti) layer and a gold (Au) layer.

4. The microfluidic sensing device of claim 3, wherein the first Ti layer of the band electrode and the Ti layer of the working electrode are each about 5 nm thick, the Au layer of the band electrode and the Au layer of the working electrode are each about 100 nm thick, the second Ti layer of the band electrode is about 5 nm thick, and the Ag layer of the band electrode is about 30 nm thick.

5. The microfluidic sensing device of claim 1, further comprising an electric power source connected to the band and working electrodes.

6. The microfluidic sensing device of claim 5, wherein the electric power source comprises one or more alkaline or lithium-ion battery units.

7. The microfluidic sensing device of claim 1, wherein the Ag layer has a rectangular, round or oval-shaped cross-section with a constant area.

8. The microfluidic sensing device of claim 1, wherein the a diameter or width of the channel is in the range of about 1 μm to 1,000 μm.

9. The microfluidic sensing device of claim 1, wherein the channel is made of a material comprising polydimethylsiloxane or poly(methyl methacrylate).

10. An article of manufacture comprising the microfluidic sensing device of claim 1.

11. The article of manufacture of claim 10, wherein the article is a single use and disposable unit or kit.

* * * * *